United States Patent
Zhong et al.

(10) Patent No.: US 9,857,623 B2
(45) Date of Patent: Jan. 2, 2018

(54) REFLECTIVE FLEXIBLE LIQUID CRYSTAL DISPLAY

(71) Applicant: Shenzhen China Star Optoelectronics Technology Co., Ltd., Shenzhen (CN)

(72) Inventors: Xinhui Zhong, Shenzhen (CN); Yungjui Lee, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 138 days.

(21) Appl. No.: 14/758,953

(22) PCT Filed: Apr. 3, 2015

(86) PCT No.: PCT/CN2015/075849
§ 371 (c)(1),
(2) Date: Jul. 1, 2015

(87) PCT Pub. No.: WO2016/131210
PCT Pub. Date: Aug. 25, 2016

(65) Prior Publication Data
US 2016/0363811 A1 Dec. 15, 2016

(30) Foreign Application Priority Data
Feb. 17, 2015 (CN) .......................... 2015 1 0085689

(51) Int. Cl.
*G02F 1/1337* (2006.01)
*G02F 1/1335* (2006.01)
(Continued)

(52) U.S. Cl.
CPC ..... *G02F 1/133528* (2013.01); *G02B 6/0055* (2013.01); *G02B 6/0065* (2013.01);
(Continued)

(58) Field of Classification Search
CPC .. G02F 1/1335; G02F 1/13363; G02F 1/1393; G02F 1/1368; G02F 1/13439;
(Continued)

(56) References Cited

U.S. PATENT DOCUMENTS 5,721,599 A * 2/1998 Cheng ............... G02F 1/133512
349/106
6,122,027 A * 9/2000 Ogawa .............. G02F 1/133345
349/106
(Continued)

FOREIGN PATENT DOCUMENTS

| CN | 101813842 A | 8/2010 |
|---|---|---|
| CN | 102692752 A | 9/2012 |
| CN | 103969896 A | 8/2014 |

*Primary Examiner* — Hoan C Nguyen
(74) *Attorney, Agent, or Firm* — Leong C. Lei

(57) ABSTRACT

The present invention provides a reflective flexible liquid crystal display, which includes: an upper flexible substrate (1), a lower flexible substrate (3) arranged opposite to the upper flexible substrate (1), a layer of liquid crystal (5) filled between the upper flexible substrate (1) and the lower flexible substrate (3), a circular polarization sheet (7) arranged on an upper surface of the upper flexible substrate (1), and a flexible light guide plate (9) arranged on an upper surface of the circular polarization sheet (7). The upper flexible substrate (1) and the flexible light guide plate (9) are both transparent and the lower flexible substrate (3) includes a reflector layer (37) formed thereon. The reflective flexible liquid crystal display has a simple structure, allowing the liquid crystal display to be applied to flexible displaying.

12 Claims, 8 Drawing Sheets

(51) Int. Cl.

| | |
|---|---|
| *F21V 8/00* | (2006.01) |
| *G02F 1/1333* | (2006.01) |
| *G02F 1/13363* | (2006.01) |
| *G02F 1/1343* | (2006.01) |
| *G02F 1/1368* | (2006.01) |
| *G02F 1/139* | (2006.01) |

(52) U.S. Cl.
CPC .......... *G02F 1/1368* (2013.01); *G02F 1/1393* (2013.01); *G02F 1/13363* (2013.01); *G02F 1/13439* (2013.01); *G02F 1/133305* (2013.01); *G02F 1/133512* (2013.01); *G02F 1/133514* (2013.01); *G02F 1/133553* (2013.01); *G02F 2001/133357* (2013.01); *G02F 2001/133541* (2013.01); *G02F 2001/133616* (2013.01); *G02F 2001/133638* (2013.01)

(58) Field of Classification Search
CPC ......... G02F 1/133553; G02F 1/133528; G02F 1/133514; G02F 1/133512; G02F 1/133305; G02F 2001/133541; G02F 2001/133357; G02F 2001/133638; G02B 6/0065; G02B 6/0055

USPC ........................................................ 349/106
See application file for complete search history.

(56) References Cited

U.S. PATENT DOCUMENTS

| | | | | |
|---|---|---|---|---|
| 6,181,396 | B1* | 1/2001 | Kanoh | G02F 1/133553 205/477 |
| 6,392,729 | B1* | 5/2002 | Izumi | G02F 1/133512 349/106 |
| 6,879,359 | B1* | 4/2005 | Kikkawa | G02F 1/133553 257/57 |
| 2003/0210367 | A1 | 11/2003 | Nakano et al. | |
| 2004/0012737 | A1* | 1/2004 | Hebiguchi | G02F 1/133553 349/113 |
| 2006/0044498 | A1* | 3/2006 | Lee | G02F 1/133555 349/117 |
| 2006/0187385 | A1* | 8/2006 | Liao | G02F 1/133305 349/114 |
| 2011/0007380 | A1* | 1/2011 | Chen | G02B 6/0053 359/296 |
| 2013/0270223 | A1* | 10/2013 | Lee | G03F 7/031 216/24 |

* cited by examiner

REFLECTIVE FLEXIBLE LIQUID CRYSTAL DISPLAY

BACKGROUND OF THE INVENTION

1. Field of the Invention

The present invention relates to the field of display technology, and in particular to a reflective flexible liquid crystal display.

2. The Related Arts

With the prevailing of wearable application devices, such as intelligent goggles and intelligent watches, there is an increasing demand of the display industry for flexible display devices.

An organic light emitting display (OLED) has various features of being self-luminous, requiring no backlighting, small device thickness, wide view angle, and fast response and has natural advantage to serve as a flexible display. However, the OLED industry has a high technical threshold in view of high manufacturing difficulty, low yield rate, high cost, and high sales price, all these hindering the OLED from being widely prevailing.

Liquid crystal displays (LCDs) are most prevailing ones in the market and the manufacturing technology is sufficiently mature, having high yield rate and relatively low cost, making them highly accepted by the market.

The main stream LCDs in the market can be generally classified in three categories, which are respectively twisted nematic and super twisted nematic (TN/STN) type, in-plane switching (IPS) type, and vertical alignment (VA) type. Although applying different principles to control and adjust liquid crystal displaying, these three types of LCD have similar basic structures, of which a representative structure is illustrated in FIG. 1, comprising at least a liquid crystal display panel 100 and a backlighting component 200. The liquid crystal panel itself does not emit light and must be provided with light from the backlighting component. In addition, the liquid crystal display panel is composed of a color filter (CF) substrate, a thin-film transistor (TFT) array substrate, and a layer of liquid crystal filled between the two substrates. The CF substrate comprises a polarizer attached to a surface thereof that is distant from the liquid crystal layer. The TFT array also comprises a polarizer attached to a surface thereof distant from the liquid crystal layer. The LCD uses an electric field to control the orientation of the liquid crystal molecules thereof in order to change the state of polarization of light and using the polarizers to achieve passage or blocking of an optical path, achieving the purpose of displaying.

As discussed above, the liquid crystal display panel is composed of two substrates and a liquid crystal layer interposed therebetween and a backlighting component is needed to supply light for displaying. The LCD does not belong to the category of self-luminous liquid state display devices. During the progress of development of the LCD toward flexible displaying applications, it is not sufficient for practical applications to just make the liquid crystal display panel a flexible and deflectable one and it also needs flexible backlighting components to be used in combination therewith. The backlighting components include various parts, including a light source, a multilayered film, and a light guide plate. Thus, developing a flexible LCD product must adopt different ways and processes and is not one as easy of making a liquid crystal display panel flexible.

SUMMARY OF THE INVENTION

An object of the present invention is to provide a reflective flexible liquid crystal display, which has a simple structure and allows the liquid crystal display to be applicable to flexible displaying.

To achieve the above object, the present invention provides a reflective flexible liquid crystal display, which comprises: an upper flexible substrate, a lower flexible substrate arranged opposite to the upper flexible substrate, a layer of liquid crystal filled between the upper flexible substrate and the lower flexible substrate, a circular polarization sheet arranged on an upper surface of the upper flexible substrate, and a flexible light guide plate arranged on an upper surface of the circular polarization sheet;

wherein the upper flexible substrate and the flexible light guide plate are both transparent and the lower flexible substrate comprises a reflector layer formed thereon.

The flexible light guide plate is provided, on at least one lateral side thereof, with a side light source.

The flexible light guide plate has an upper surface on which a plurality of scattering grid points is distributed.

The circular polarization sheet has a lower surface to which a $\lambda/4$ film is attached, the $\lambda/4$ film having a fast axis that defines an included angle of 45 degrees with respect to an absorption axis of the circular polarization sheet.

The liquid crystal layer is a vertical alignment type liquid crystal layer and after application of voltage, the liquid crystal layer causes phase retardation of which a maximum amount corresponds to ¼ of visible light wavelength.

The upper flexible substrate comprises a transparent flexible base, a planarization layer formed on a lower surface of the transparent flexible base, a color filter layer arranged between the transparent flexible base and the planarization layer, a transparent conductor electrode formed on a lower surface of the planarization layer, and a black matrix barrier formed on a lower surface of the transparent conductor electrode.

The transparent flexible substrates and the flexible light guide plate are made of materials of glass, PMMA, PC, PE, PP, PET, or PI.

Optionally, the lower flexible substrate comprises a flexible base and a gate terminal, a gate insulation layer, a semiconductor layer, source/drain terminals, an interlayer insulation layer, and the reflector layer sequentially formed on the flexible base;

the reflector layer is a metal layer, which is located on the interlayer insulation layer; and the gate terminal, the semiconductor layer, and the source/drain terminals collectively form a thin-film transistor and the reflector layer is in contact with the source/drain terminals and also serves as an electrode.

Alternatively, the lower flexible substrate comprises a flexible base and a gate terminal, a reflector layer, a gate insulation layer, a semiconductor layer, source/drain terminals, an interlayer insulation layer, and a transparent electrode sequentially formed on the flexible base;

the reflector layer is a metal layer, which is arranged between the flexible base and the gate insulation layer; and the gate terminal, the semiconductor layer, and the source/drain terminals collectively form a thin-film transistor and the transparent electrode is in contact with the source/drain terminals.

Alternatively, the lower flexible substrate comprises a reflector layer and a reflector protection layer, a gate terminal, a gate insulation layer, a semiconductor layer, source/ drain terminals, an interlayer insulation layer, and a transparent electrode sequentially formed on the reflector layer;

the reflector layer is a flexible metallic light-reflecting film or a flexible base coated with a thin metal film; and the gate terminal, the semiconductor layer, and the source/drain terminals collectively form a thin-film transistor and the transparent electrode is in contact with the source/drain terminals.

The present invention also provides a reflective flexible liquid crystal display, which comprises: an upper flexible substrate, a lower flexible substrate arranged opposite to the upper flexible substrate, a layer of liquid crystal filled between the upper flexible substrate and the lower flexible substrate, a circular polarization sheet arranged on an upper surface of the upper flexible substrate, and a flexible light guide plate arranged on an upper surface of the circular polarization sheet;

wherein the upper flexible substrate and the flexible light guide plate are both transparent and the lower flexible substrate comprises a reflector layer formed thereon;

wherein the flexible light guide plate is provided, on at least one lateral side thereof, with a side light source; and wherein the flexible light guide plate has an upper surface on which a plurality of scattering grid points is distributed.

The efficacy of the present invention is that the present invention provides a reflective flexible liquid crystal display, which comprises an arrangement of upper and lower flexible substrates and a light guide plate for being applicable to flexible displaying and which comprises a sole circular polarization sheet arranged on an upper surface of the upper flexible substrate and a reflector layer arranged on the lower flexible substrate to achieve control of an optical path for realizing reflective displaying, and thus, compared to a conventional liquid crystal display that involves two polarization sheets, has a simpler structure.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
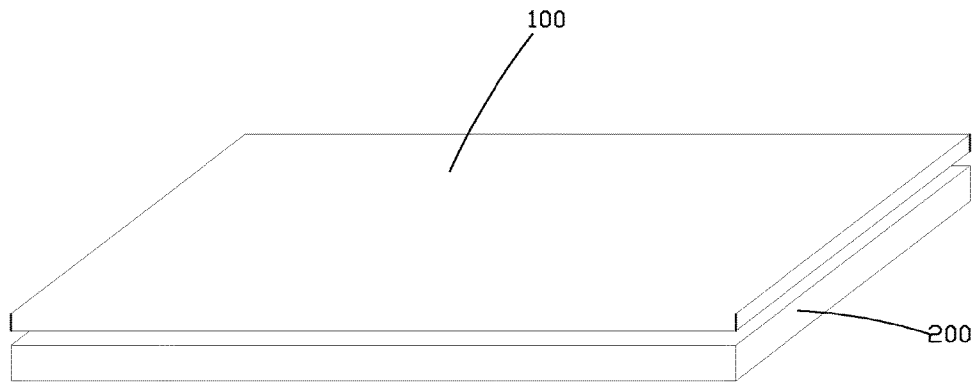
FIG. 1 is a schematic view showing a basic structure of a conventional liquid crystal display.
Figure 2:
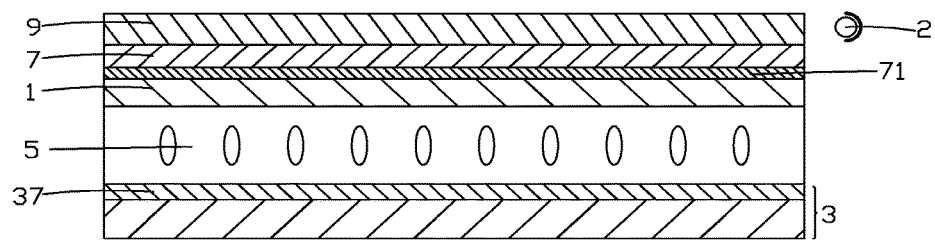
FIG. 2 is a cross-sectional view showing a reflective flexible liquid crystal display according to the present invention.

Referring to FIGS. 2-8, the present invention provides a reflective flexible liquid crystal display. As shown in FIG. 2, the reflective flexible liquid crystal display comprises: an upper flexible substrate 1, a lower flexible substrate 3 arranged opposite to the upper flexible substrate 1, a layer of liquid crystal 5 filled between the upper flexible substrate 1 and the lower flexible substrate 3, a circular polarization sheet 7 arranged on an upper surface of the upper flexible substrate 1, and a flexible light guide plate 9 arranged on an upper surface of the circular polarization sheet 7. The upper flexible substrate 1 and the flexible light guide plate 9 are both transparent and the lower flexible substrate 3 comprises a reflector layer 37 formed thereon.

Further, the flexible light guide plate 9 is provided, on at least one lateral side thereof, with a side light source 2. In the embodiment illustrated in FIG. 2, the flexible light guide plate 9 has one lateral side at which a side light source 2 is arranged.

The liquid crystal layer 5 is a vertical alignment (VA) type liquid crystal layer. With no voltage applied thereto, liquid crystal molecules contained in the liquid crystal layer 5 are lined up in a direction perpendicular to a horizontal direction, where no phase retardation is caused when light passes through the liquid crystal layer 5; and with the application of a voltage, the liquid crystal molecules of the liquid crystal layer 5 are caused to rotate to a predetermined angle with respect to the horizontal direction, where retardation of phase occurs when light passes through the liquid crystal layer 5 and the maximum amount of retardation of phase is ¼ of the visible light wavelength. More precisely speaking, the multiplication of a cell thickness of the liquid crystal layer 5 and a difference of the refractive index of the liquid crystal before and after the application of the voltage is equal to ¼ of the visible light wavelength, namely between 100-200 nm.

Figure 3:
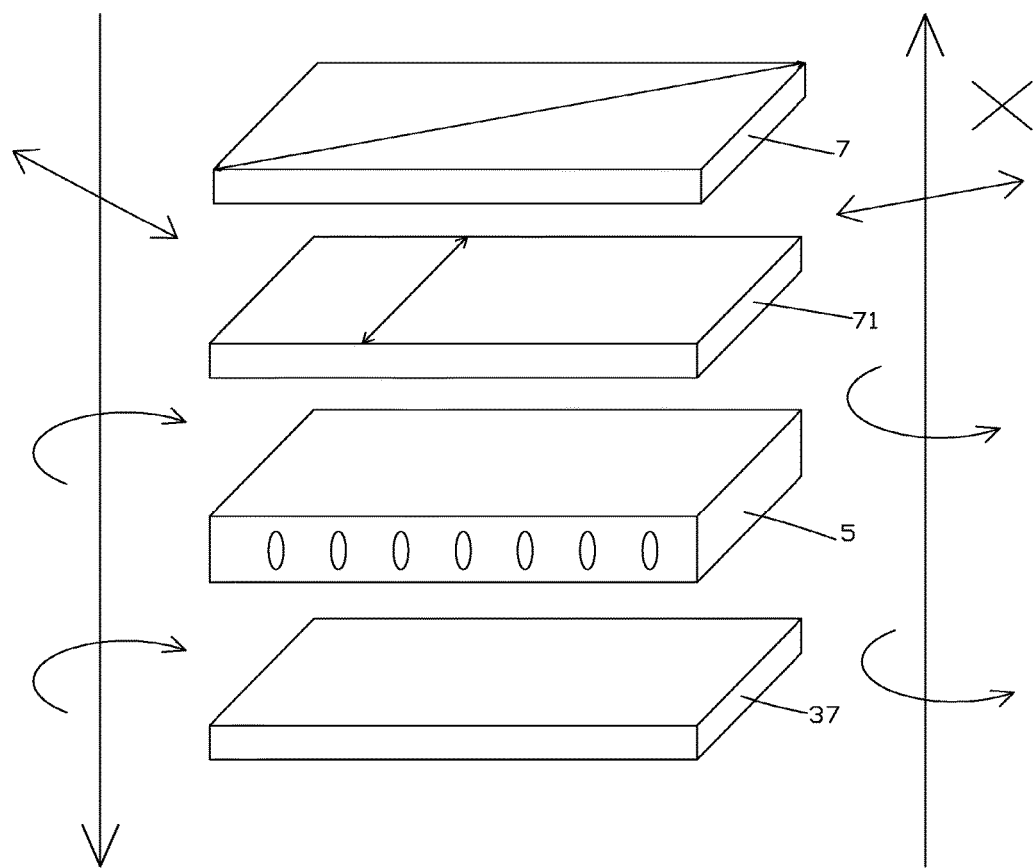
FIG. 3 is a schematic view illustrating an optical path of the reflective flexible liquid crystal display according to the present invention in a state that no voltage is applied thereto.
Figure 4:
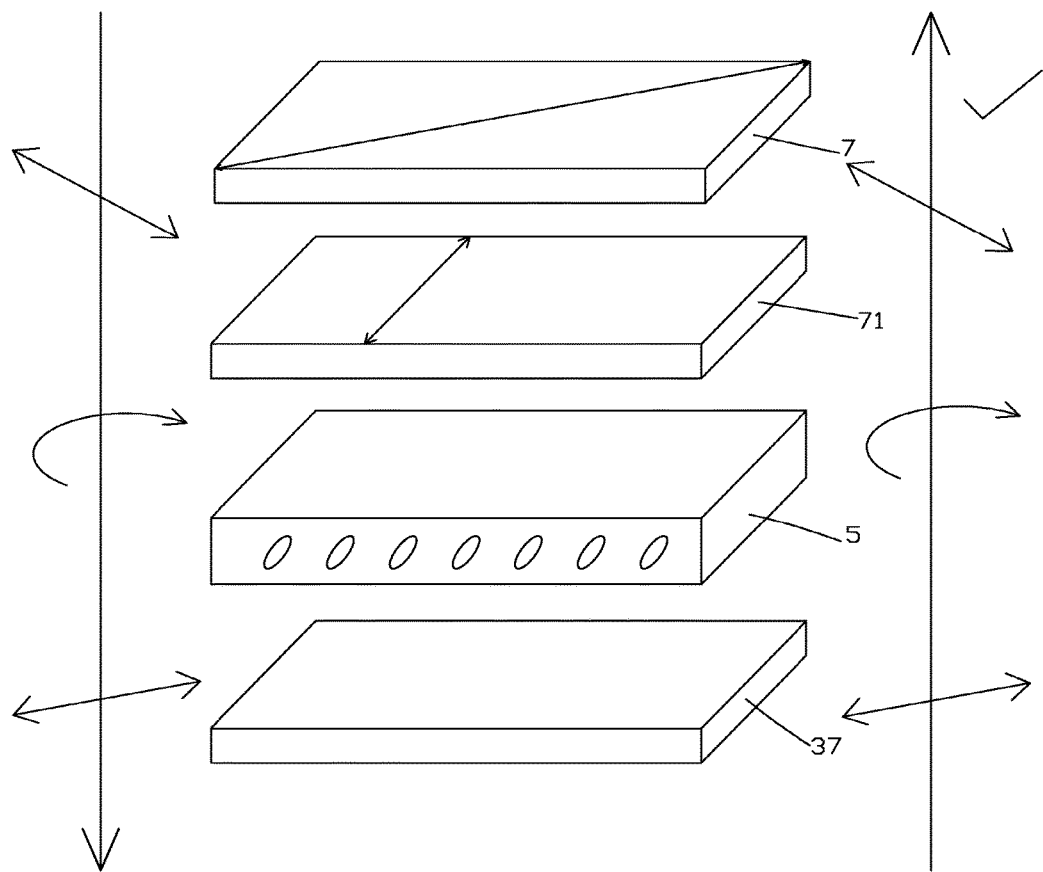
FIG. 4 is a schematic view illustrating an optical path of the reflective flexible liquid crystal display according to the present invention in a condition that a voltage is applied thereto.

Referring collectively to FIGS. 3 and 4, the circular polarization sheet 7 has a lower surface to which a λ/4 film 71 is attached. In the present invention, the λ/4 film is made of a positive crystal having a fast axis perpendicular to a direction of an optical axis and defining an included angle of 45 degrees with respect to an absorption axis of the circular polarization sheet 7. The λ/4 film provides a function of light polarization.

The circular polarization sheet 7, the λ/4 film 71, the liquid crystal layer 5, and the reflector layer 37 collectively achieve a function of controlling an optical path. As shown in FIG. 3, in a condition of no voltage applied, incident light is sequentially subjected to polarization by the polarization sheet 7 and the λ/4 film 71 and then transmits through the liquid crystal layer 5, without phase retardation, to reach the reflector layer 37. The reflector layer 37 reflects the light and the reflected light transmits the liquid crystal layer 5 without phase retardation and then polarized by the λ/4 film 71 to eventually make the reflected light parallel to the absorption axis of the circular polarization sheet 7 and thus absorbed by the circular polarization sheet 7 without being given off. Thus, no displaying is made. As shown in FIG. 4, with a voltage applied, the incident light is sequentially subjected to polarization by the polarization sheet 7 and the λ/4 film 71 and then transmits through the liquid crystal layer 5 with retardation of phase to then reach the reflector layer 37. The reflector layer 37 reflects the light and the reflected light transmits through the liquid crystal layer 5 with phase retarded again and is then polarized by the λ/4 film 71 to eventually make the reflected light perpendicular to the absorption axis of the circular polarization sheet 7 and thus allowed to transmit through the circular polarization sheet 7 for outward emission. Thus, displaying is achieved.

Figure 5:
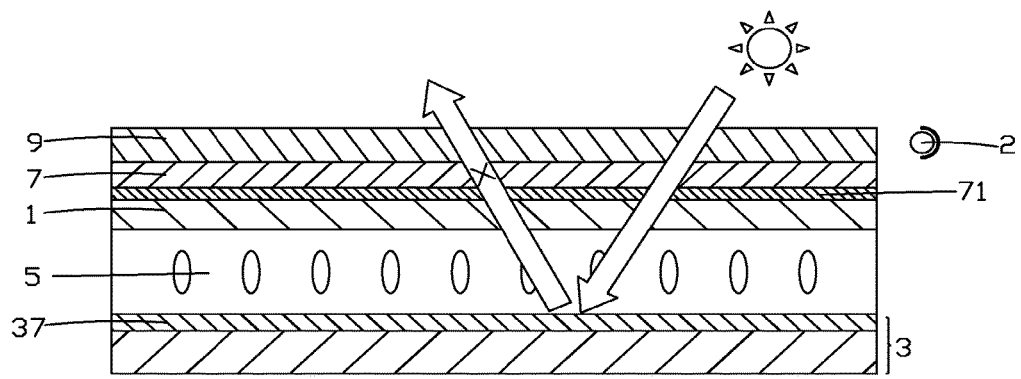
FIG. 5 is a schematic view illustrating a condition of operation of the reflective flexible liquid crystal display according to the present invention using an external light source in a condition that no voltage is applied thereto.
Figure 6:
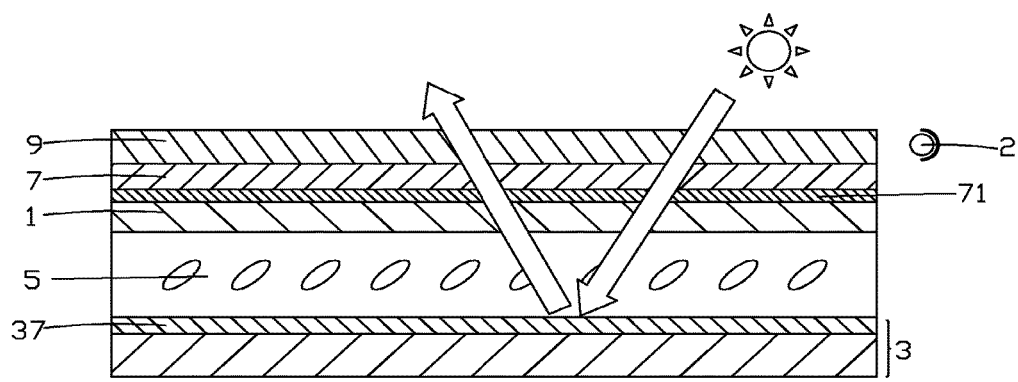
FIG. 6 is a schematic view illustrating a condition of operation of the reflective flexible liquid crystal display according to the present invention using an external light source in a condition that a voltage is applied thereto.

As shown in FIGS. 5 and 6, in a condition where the external light has a strong intensity, such as being irradiated by sun light or a fluorescent light, the reflective flexible liquid crystal display of the present invention may use the external lighting, such as the sun light or the fluorescent light, to operate without activation of the side light source 2. With no voltage applied, incident light from an external light source is subjected to combined processing achieved with the circular polarization sheet 7, the λ/4 film 71, the liquid crystal layer 5, and the reflector layer 37 to allow the reflected light to be eventually made parallel to the absorption axis of the circular polarization sheet 7 and thus absorbed by the circular polarization sheet 7 without being emitted outward so that no displaying is achieved. In a condition of a voltage being applied, the incident light from the external light source is subjected to combined processing achieved with the circular polarization sheet 7, the λ/4 film 71, the liquid crystal layer 5, and the reflector layer 37 to allow the reflected light to be eventually perpendicular to the absorption axis of the circular polarization sheet 7 and allowed to pass through the circular polarization sheet 7 for outward emission so that displaying is achieved.

Figure 7:
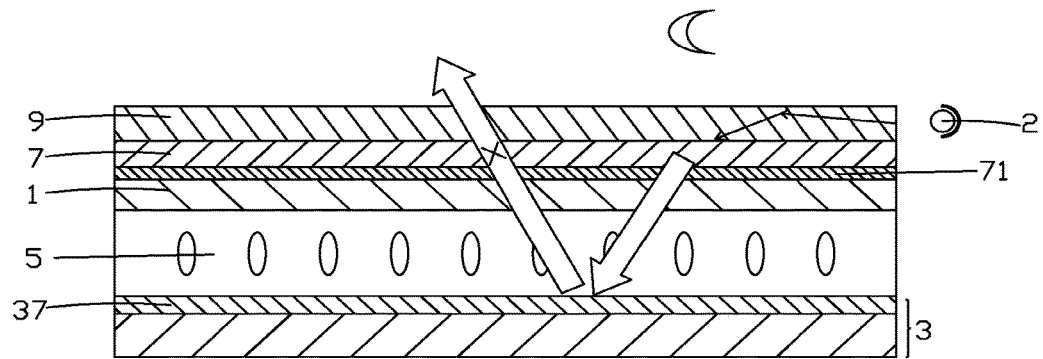
FIG. 7 is a schematic view illustrating a condition of operation of the reflective flexible liquid crystal display according to the present invention using a side light source in a condition that no voltage is applied thereto.
Figure 8:
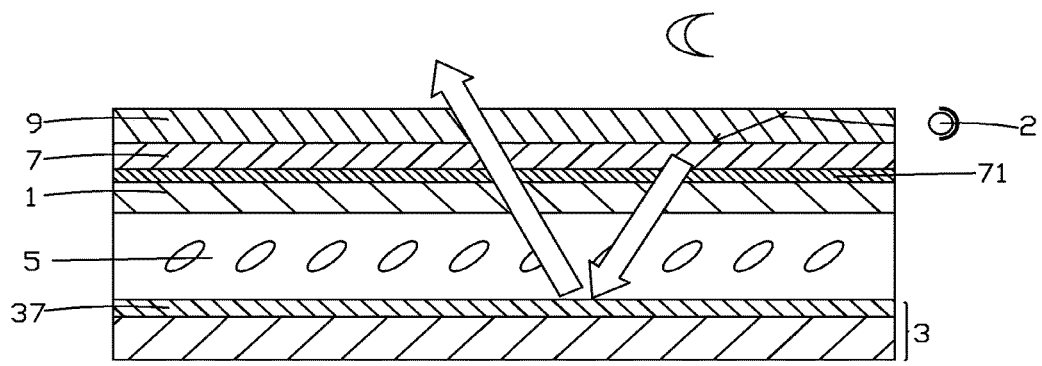
FIG. 8 is a schematic view illustrating a condition of operation of the reflective flexible liquid crystal display according to the present invention using a side light source in a condition that a voltage is applied thereto.

As shown in FIGS. 7 and 8, in a condition where the external light has a weak intensity, such as being not irradiated by sun light or a fluorescent light, the reflective flexible liquid crystal display of the present invention is operable with the side light source 2 being activated and brightness regulation of the side light source 2 can be made according to the intensity of the external lighting to allow the liquid crystal display to be operated normally. With no voltage applied, light emitting from the side light source 2 is reflected and spread by the light guide plate 9 to form incident light, which is subjected to combined processing achieved with the circular polarization sheet 7, the λ/4 film 71, the liquid crystal layer 5, and the reflector layer 37 to allow the reflected light to be eventually made parallel to the absorption axis of the circular polarization sheet 7 and thus absorbed by the circular polarization sheet 7 without being emitted outward so that no displaying is achieved. In a condition of a voltage being applied, light emitting from the side light source 2 is reflected and spread by the light guide plate 9 to form incident light, which is then subjected to combined processing achieved with the circular polarization sheet 7, the λ/4 film 71, the liquid crystal layer 5, and the reflector layer 37 to allow the reflected light to be eventually perpendicular to the absorption axis of the circular polarization sheet 7 and allowed to pass through the circular polarization sheet 7 for outward emission so that displaying is achieved.

In the above reflective flexible liquid crystal display, the arrangement of the upper and lower flexible substrates 1, 3 and the light guide plate 9 allows for application to flexible displaying. Since only one circular polarization sheet 7 is used and arranged on the upper surface of the upper flexible substrate 1 and since the reflector layer 37 is provided on the lower flexible substrate 3 to control the optical path for achieving reflective displaying, compared to the conventional liquid crystal display in which two polarization sheets are involved, the structure of the present invention is simple.

Figure 9:
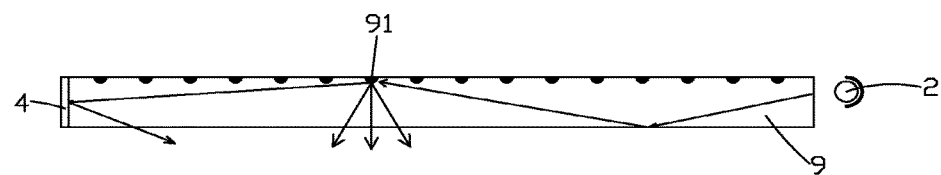
FIG. 9 is a front view showing a light guide plate of the reflective flexible liquid crystal display according to the present invention.
Figure 10:
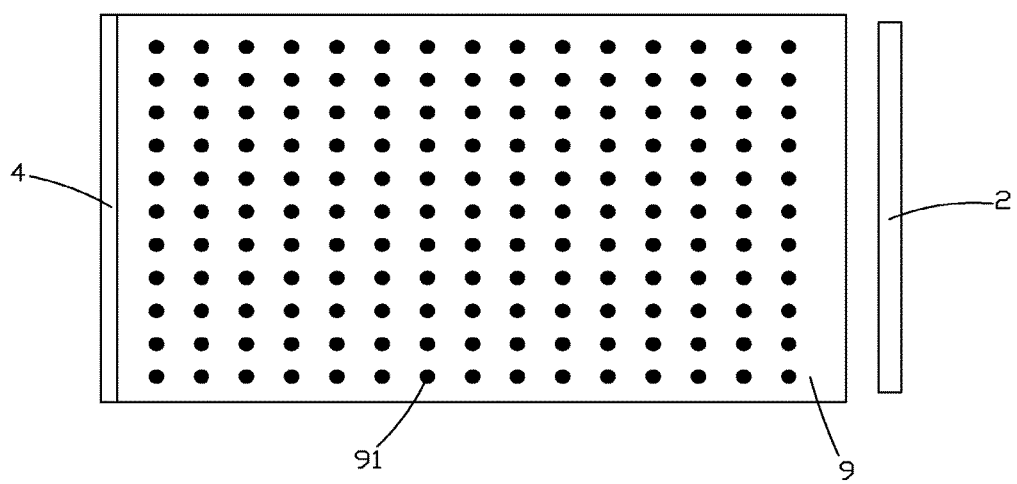
FIG. 10 is a top plan view showing the light guide plate of the reflective flexible liquid crystal display according to the present invention.

Specifically, the flexible light guide plate 9 is formed of a transparent flexible base material, of which the material can be selected from, but not limited to, the following substances: poly(methyl methacrylate) (PMMA), polycarbonate (PC), polyethylene (PE), polypropylene (PP), polyethylene terephthalate (PET), or polyimide (PI). As shown in FIGS. 9 and 10, the flexible light guide plate 9 has an upper surface on which a plurality of scattering grid points 91 is distributed for enhancing the effect of light spreading achieved by the flexible light guide plate 9. The flexible light guide plate 9 has a lateral side that is opposite to the side light source 2 and is provided with a reflector plate 4 for improving utilization of light.

The side light source 2 is preferably a light-emitting diode (LED) light tube.

Figure 11:
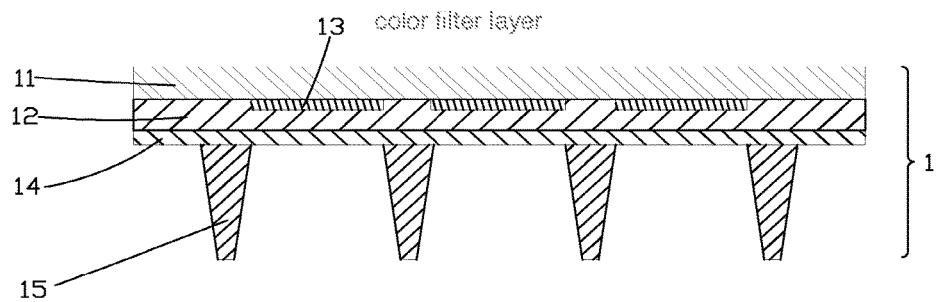
FIG. 11 is a cross-sectional view showing an upper flexible substrate of the reflective flexible liquid crystal display according to the present invention.
Figure 12:
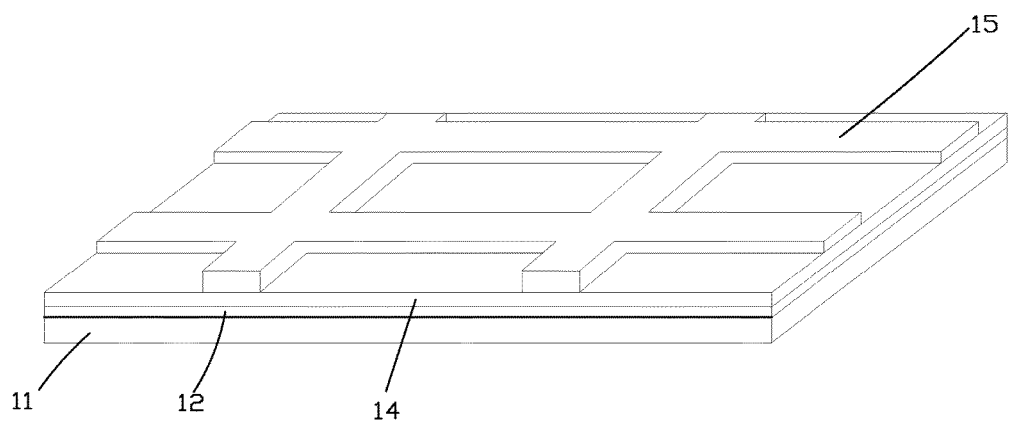
FIG. 12 is a perspective view showing the upper flexible substrate of the reflective flexible liquid crystal display according to the present invention.

As shown in FIGS. 11 and 12, the upper flexible substrate 1 comprises a transparent flexible base 11, a planarization layer 12 formed on a lower surface of the transparent flexible base 11, a color filter layer 13 arranged between the transparent flexible base 11 and the planarization layer 12, a transparent conductor electrode 14 formed on a lower surface of the planarization layer 12, and a black matrix barrier 15 formed on a lower surface of the transparent conductor electrode 14. The upper flexible substrate 1 has a function corresponding to a color filter (CF) substrate of a conventional liquid crystal display panel. Further, the transparent flexible base 11 can be made of a material selected from, but not limited to, the following substances: glass, PMMA, PC, PE, PP, PET, or PI.

The lower flexible substrate 3 has a function corresponding to a thin-film transistor (TFT) substrate of a conventional liquid crystal display panel.

Figure 13:
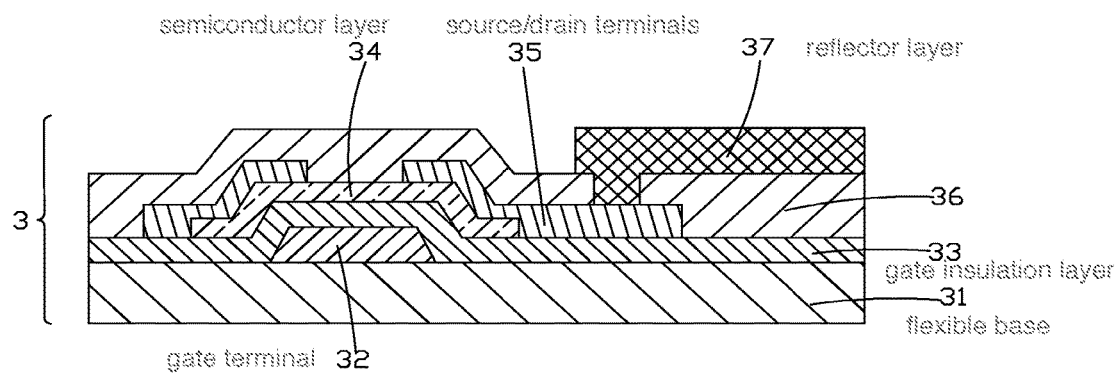
FIG. 13 is a cross-sectional view showing a first embodiment of a lower flexible substrate of the reflective flexible liquid crystal display according to the present invention.

FIG. 13 shows a first embodiment of the lower flexible substrate 3. In the first embodiment, the lower flexible substrate 3 comprises a flexible base 31 and a gate terminal 32, a gate insulation layer 33, a semiconductor layer 34, source/drain terminals 35, an interlayer insulation layer 36, and a reflector layer 37 sequentially formed on the flexible base 31.

The reflector layer 37 comprises a metal layer, which is located on the interlayer insulation layer 36.

The gate terminal 32, the semiconductor layer 34, and the source/drain terminals 35 collectively form a TFT. The reflector layer 37 is in contact with the source/drain terminals 35 and also serves as an electrode.

The gate insulation layer 33 and the interlayer insulation layer 36 are made of a material of silicon nitride (SiNx).

Figure 14:
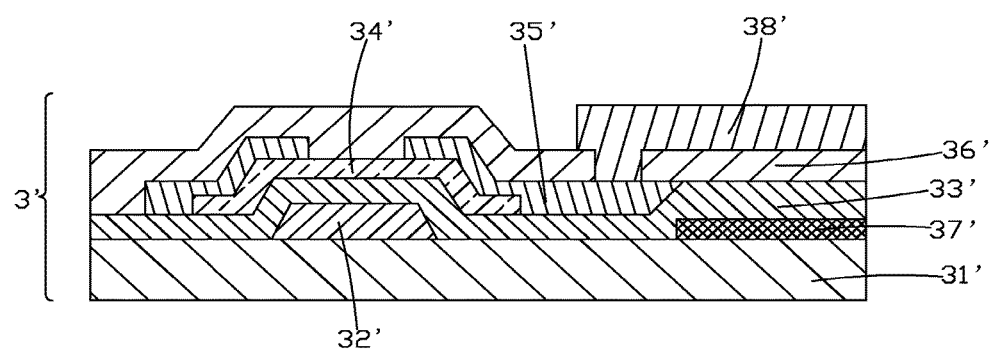
FIG. 14 is a cross-sectional view showing a second embodiment of the lower flexible substrate of the reflective flexible liquid crystal display according to the present invention.

FIG. 14 shows a second embodiment of the lower flexible substrate 3'. In the second embodiment, the lower flexible substrate 3' comprises a flexible base 31' and a gate terminal 32', a reflector layer 37', a gate insulation layer 33', a semiconductor layer 34', source/drain terminals 35', an interlayer insulation layer 36', and a transparent electrode 38' sequentially formed on the flexible base 31'.

The reflector layer 37' comprises a metal layer, which is arranged between the flexible base 31' and the gate insulation layer 33'.

The gate terminal 32', the semiconductor layer 34', and the source/drain terminals 35' collectively form a TFT. The transparent electrode 38' is in contact with the source/drain terminals 35'.

The gate insulation layer 33' and the interlayer insulation layer 36' are made of a material of SiNx.

Figure 15:
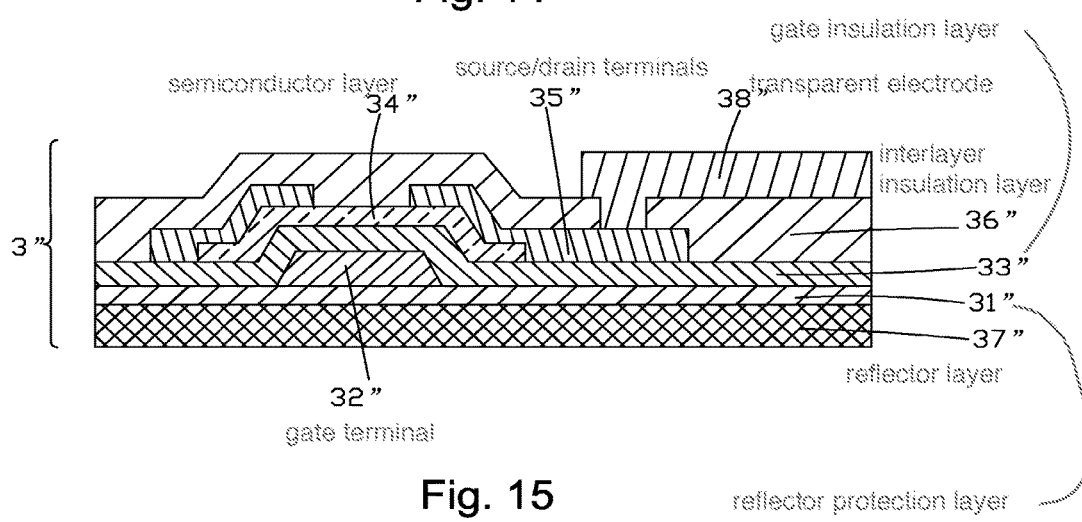
FIG. 15 is a cross-sectional view showing a third embodiment of the lower flexible substrate of the reflective flexible liquid crystal display according to the present invention.

FIG. 15 shows a third embodiment of the lower flexible substrate 3". In the second embodiment, the lower flexible substrate 3" comprises a reflector layer 37" and a reflector protection layer 31", a gate terminal 32", a gate insulation layer 33", a semiconductor layer 34", source/drain terminals 35", an interlayer insulation layer 36", and a transparent electrode 38" sequentially formed on the reflector layer 37".

The reflector layer 37" comprise a flexible metallic light-reflecting film or a flexible base coated with a thin metal film.

The gate terminal 32", the semiconductor layer 34", and the source/drain terminals 35" collectively form a TFT. The transparent electrode 38" is in contact with the source/drain terminals 35".

The reflector protection layer 31", the gate insulation layer 33", and the interlayer insulation layer 36" are made of a material of SiNx.

In summary, the present invention provides a reflective flexible liquid crystal display, which comprises an arrangement of upper and lower flexible substrates and a light guide plate for being applicable to flexible displaying and which comprises a sole circular polarization sheet arranged on an upper surface of the upper flexible substrate and a reflector layer arranged on the lower flexible substrate to achieve control of an optical path for realizing reflective displaying, and thus, compared to a conventional liquid crystal display that involves two polarization sheets, has a simpler structure.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A reflective flexible liquid crystal display, comprising: an upper flexible substrate, a lower flexible substrate arranged opposite to the upper flexible substrate, a layer of liquid crystal filled between the upper flexible substrate and the lower flexible substrate, a circular polarization sheet arranged on an upper surface of the upper flexible substrate, and a flexible light guide plate arranged on an upper surface of the circular polarization sheet;

wherein the upper flexible substrate and the flexible light guide plate are both transparent and the lower flexible substrate comprises a reflector layer formed thereon; and wherein the liquid crystal layer is a vertical alignment type liquid crystal layer and wherein without application of voltage, liquid crystal molecules contained in the liquid crystal layer are in a first condition where the liquid crystal molecules are lined in a direction substantially perpendicular to a horizontal direction and with application of voltage, the liquid crystal molecules are rotated from the first condition to a second condition where the liquid crystal molecules are set at an angular position of a predetermined angle with respect to the horizontal direction to cause phase retardation of light passing therethrough and transmitting through the circular polarization sheet, wherein the phase retardation of the light corresponds to or is less than ¼ of wavelength of the light.

2. The reflective flexible liquid crystal display as claimed in claim 1, wherein the flexible light guide plate is provided, on at least one lateral side thereof, with a side light source.

3. The reflective flexible liquid crystal display as claimed in claim 1, wherein the flexible light guide plate has an upper surface on which a plurality of scattering grid points is distributed.

4. The reflective flexible liquid crystal display as claimed in claim 1, wherein the upper flexible substrate comprises a transparent flexible base, a planarization layer formed on a lower surface of the transparent flexible base, a color filter layer arranged between the transparent flexible base and the planarization layer, a transparent conductor electrode formed on a lower surface of the planarization layer, and a black matrix barrier formed on a lower surface of the transparent conductor electrode.

5. The reflective flexible liquid crystal display as claimed in claim 1, wherein the lower flexible substrate comprises a flexible base and a gate terminal, a gate insulation layer, a semiconductor layer, source/drain terminals, an interlayer insulation layer, and the reflector layer sequentially formed on the flexible base;

the reflector layer is a metal layer, which is located on the interlayer insulation layer; and the gate terminal, the semiconductor layer, and the source/drain terminals collectively form a thin-film transistor and the reflector layer is in contact with the source/drain terminals and also serves as an electrode.

6. The reflective flexible liquid crystal display as claimed in claim 1, wherein the lower flexible substrate comprises a flexible base and a gate terminal, a reflector layer, a gate insulation layer, a semiconductor layer, source/drain terminals, an interlayer insulation layer, and a transparent electrode sequentially formed on the flexible base;

the reflector layer is a metal layer, which is arranged between the flexible base and the gate insulation layer; and the gate terminal, the semiconductor layer, and the source/drain terminals collectively form a thin-film transistor and the transparent electrode is in contact with the source/drain terminals.

7. The reflective flexible liquid crystal display as claimed in claim 1, wherein the lower flexible substrate comprises a reflector layer and the lower flexible substrate also comprises a reflector protection layer, a gate terminal, a gate insulation layer, a semiconductor layer, source/drain terminals, an interlayer insulation layer, and a transparent electrode that are formed on the reflector layer in sequence from bottom to top;

the reflector layer is a flexible metallic light-reflecting film or a flexible base coated with a thin metal film; and the gate terminal, the semiconductor layer, and the source/drain terminals collectively form a thin-film transistor and the transparent electrode is in contact with the source/drain terminals.

8. A reflective flexible liquid crystal display, comprising: an upper flexible substrate, a lower flexible substrate arranged opposite to the upper flexible substrate, a layer of liquid crystal filled between the upper flexible substrate and the lower flexible substrate, a circular polarization sheet arranged on an upper surface of the upper flexible substrate, and a flexible light guide plate arranged on an upper surface of the circular polarization sheet;

wherein the upper flexible substrate and the flexible light guide plate are both transparent and the lower flexible substrate comprises a reflector layer formed thereon;

wherein the flexible light guide plate is provided, on at least one lateral side thereof, with a side light source;

wherein the flexible light guide plate has an upper surface on which a plurality of scattering grid points is distributed; and wherein the liquid crystal layer is a vertical alignment type liquid crystal layer and wherein without application of voltage, liquid crystal molecules contained in the liquid crystal layer are in a first condition where the liquid crystal molecules are lined in a direction substantially perpendicular to a horizontal direction and with application of voltage, the liquid crystal molecules are rotated from the first condition to a second condition where the liquid crystal molecules are set at an angular position of a predetermined angle with respect to the horizontal direction to cause phase retardation of light passing therethrough and transmitting through the circular polarization sheet, wherein the phase retardation of the light corresponds to or is less than ¼ of wavelength of the light.

9. The reflective flexible liquid crystal display as claimed in claim 8, wherein the upper flexible substrate comprises a transparent flexible base, a planarization layer formed on a lower surface of the transparent flexible base, a color filter layer arranged between the transparent flexible base and the planarization layer, a transparent conductor electrode formed on a lower surface of the planarization layer, and a black matrix barrier formed on a lower surface of the transparent conductor electrode.

10. The reflective flexible liquid crystal display as claimed in claim 8, wherein the lower flexible substrate comprises a flexible base and a gate terminal, a gate insulation layer, a semiconductor layer, source/drain terminals, an interlayer insulation layer, and the reflector layer sequentially formed on the flexible base;

the reflector layer is a metal layer, which is located on the interlayer insulation layer; and the gate terminal, the semiconductor layer, and the source/drain terminals collectively form a thin-film transistor and the reflector layer is in contact with the source/drain terminals and also serves as an electrode.

11. The reflective flexible liquid crystal display as claimed in claim 8, wherein the lower flexible substrate comprises a flexible base and a gate terminal, a reflector layer, a gate insulation layer, a semiconductor layer, source/drain terminals, an interlayer insulation layer, and a transparent electrode sequentially formed on the flexible base;

the reflector layer is a metal layer, which is arranged between the flexible base and the gate insulation layer; and the gate terminal, the semiconductor layer, and the source/drain terminals collectively form a thin-film transistor and the transparent electrode is in contact with the source/drain terminals.

12. The reflective flexible liquid crystal display as claimed in claim 8, wherein the lower flexible substrate comprises a reflector layer and the lower flexible substrate also comprises a reflector protection layer, a gate terminal, a gate insulation layer, a semiconductor layer, source/drain terminals, an interlayer insulation layer, and a transparent electrode that are formed on the reflector layer in sequence from bottom to top;

the reflector layer is a flexible metallic light-reflecting film or a flexible base coated with a thin metal film; and the gate terminal, the semiconductor layer, and the source/drain terminals collectively form a thin-film transistor and the transparent electrode is in contact with the source/drain terminals.

* * * * *